(No Model.)
O. L. PERIN.
Alcohol Still.
No. 243,297. Patented June 21, 1881.
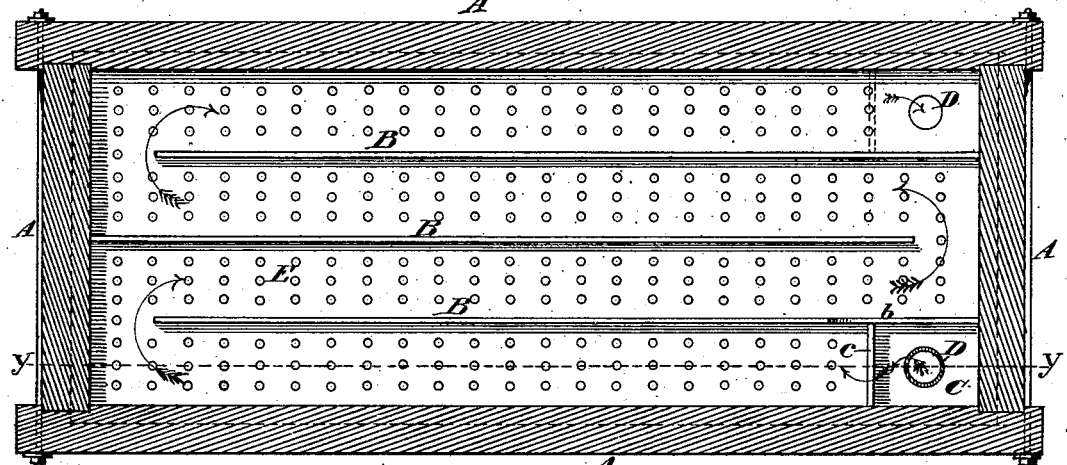
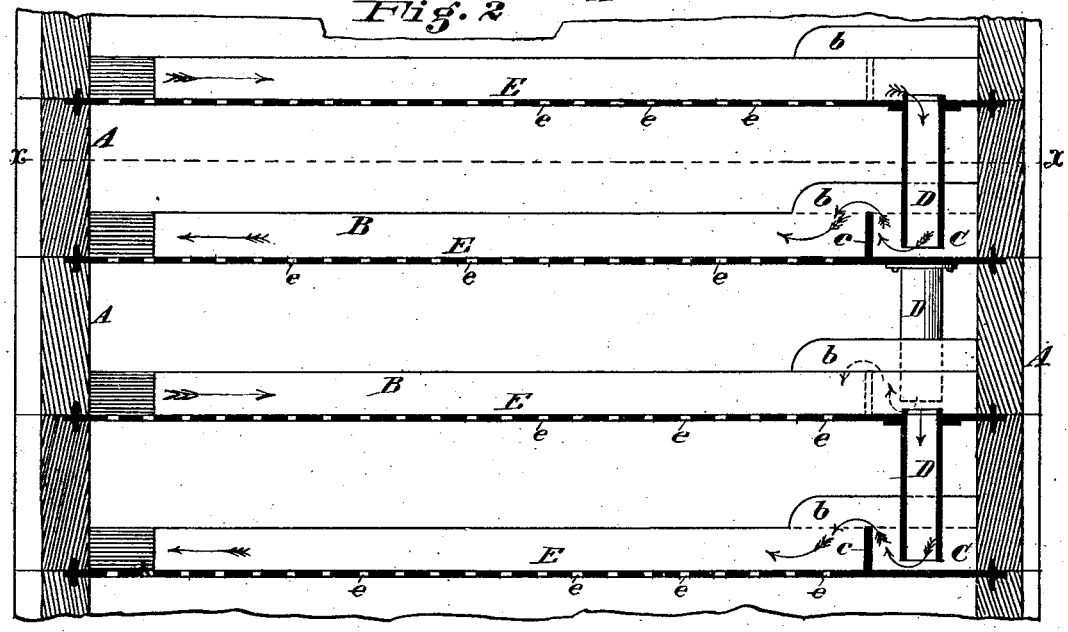
Attest
Edgar J. Gross
C. W. Withenbury.
Inventor
Oliver L. Perin
By John W. Hill
Attorney

UNITED STATES PATENT OFFICE.

OLIVER L. PERIN, OF CINCINNATI, OHIO.

ALCOHOL-STILL.

SPECIFICATION forming part of Letters Patent No. 243,297, dated June 21, 1881.

Application filed April 23, 1881. (No model.)

*To all whom it may concern:*

Be it known that I, OLIVER L. PERIN, of Cincinnati, in the county of Hamilton and State of Ohio, have invented certain new and useful Improvements in Alcohol-Stills, of which the following is a specification.

My invention is in the nature of an improvement upon a continuous still for the manufacture of alcohol for which Letters Patent were granted myself, Daniel Horan, and Dominick McGoen, July 20, 1880, and has for its object the arrangement of the several elements of the vaporizing-chambers in a novel manner, to be hereinafter described, which is calculated to improve the efficiency of the still, and at the same time will materially cheapen the construction thereof; and it consists in constructing the vaporizing-chamber of the usual rectangular form, and providing a bottom or floor of copper or other suitable material, which shall contain a great number of small perforations. Upon this bottom I erect three (or any odd number more than three) partitions, alternately attached to the opposite end timbers of the chamber. The partitions are made as much shorter than the clear length of the chamber as the width of spaces between the partitions and side timbers of the chamber and between adjacent partitions. At the end of one of the spaces between a partition and its corresponding side timber of the chamber I construct a box or bay with a weir or overflow plate of copper, raised two or three inches above the floor or bottom of the chamber. The partition at the bay is raised higher than the edge of the weir, in order that all beer or mash delivered into the bay shall be compelled to pass over the weir in a thin sheet, and be evenly distributed over the bottom of the chamber as it flows along the next connecting-channel. From the next chamber above a down-pipe is suspended, which dips into the bay below the level of the weir-plate sufficiently to form a seal against the steam-pressure in the chamber and prevent the steam ascending to the next chamber above through the down-pipe. At the opposite side of the chamber a down-pipe is suspended to dip into the bay of the next lower chamber. The upper end of the down-pipe is raised sufficiently above the floor or bottom of the chamber to which it is attached to maintain a thin sheet of liquid over the perforations in the bottom previously mentioned. The beer or mash flows through the down-pipe into the bay, over the weir-plate and down one channel formed by the partitions previously mentioned, and up the next, and down the next, and so on until it reaches the down-pipe at the opposite side of the chamber, through which it descends to the next chamber below, where the same operation is repeated, the direction of the currents of beer, however, being reversed. Meanwhile the beer or mash passes over the floor, the steam (introduced first into the lowest chamber but one of the still) and the spirituous vapor ascends from chamber to chamber through the perforations in the bottoms of the chambers, these perforations being of such dimensions that no beer or mash can descend through them against the pressure (usually five or six pounds) in the still. The heat in the steam being transmitted to the beer to expel the spirit, it condenses and works back through the down-pipes to the bottom of the still, where it is drawn off with the residuals of the beer as slop.

In the accompanying drawings, Figure 1 is a plan view of my improved vaporizing-chamber, and Fig. 2 is a sectional elevation of three chambers on the line Y Y of Fig. 1.

Similar letters of reference indicate similar parts.

A is the frame of the chamber, usually constructed of wood and tied together at the ends by draw-bolts.

B B B are the partitions, usually of wood, of which any convenient odd number more than one may be used.

C is the bay; *c*, the weir or overflow plate, securely attached to the bottom and timbers of the chamber.

D is the down-pipe, and E the copper bottom of the chamber, provided with perforations *e e e e*.

*b* is the raised portion of the side partition at the bay.

The action of the vaporizing-chamber I have already described.

I am aware that a vaporizing-chamber with a perforated metal bottom is not new, and that a patent was granted Chas. B. Jarvis, April 27, 1869, for a continuous still containing perforated plates, through which the steam and spirituous vapor passed in one direction, while at the same time the mash or beer passed through the same perforations in an opposite direction. Experience has shown that a still so constructed is a failure, and incapable of operating as set forth in said patent, for with a steam-pressure sufficient to pass the steam and spirituous vapors upward through the perforations the descent of the beer cannot take place, or with a pressure of steam so low as to permit the beer to descend through the perforations no ascent of steam will take place, and in all instances where stills have been constructed in accordance with said Jarvis patent a portion of the perforated plate has been cut away at one end to permit the descent of the beer and enable the still to work at all.

To overcome this crude arrangement, and construct a still with the perforated bottom plates for the upward passage of steam, and provide defined and properly adapted conduits for the descent of the beer from chamber to chamber, and produce a thorough and even distribution of the beer over the perforated bottom in transit through the vaporizing-chamber, is the specific purpose of my invention.

The still patented to myself, Daniel Horan, and Dominick McGoen contains a very expensive system of steam and vapor pipes, which not only enhances the cost of construction, but fails to produce as desirable a mingling of the steam and vapor with the beer as in the improved arrangement of vaporizing-chambers herein described.

In the construction of a still as many vaporizing-chambers as necessary may be employed, one or more of which at the top of the system may be employed to work over the low-wines, should any be formed.

Having described my invention, what I claim is—

The vaporizing-chamber consisting, essentially, of the frame A, partitions B B B, of which three or any odd number may be used, bay C, provided with an overflow-weir, c, down-pipe D, and perforated bottom plate, E, arranged and operating substantially as described.

In testimony whereof I have signed my name to the foregoing specification in the presence of two subscribing witnesses.

OLIVER L. PERIN.

Witnesses:
 EDGAR J. GROSS,
 DANIEL HORAN.